US010828979B2

(12) United States Patent
Nakamura et al.

(10) Patent No.: US 10,828,979 B2
(45) Date of Patent: Nov. 10, 2020

(54) VEHICULAR COOLING DEVICE (71) Applicant: Toyota Jidosha Kabushiki Kaisha, Toyota (JP)

(72) Inventors: Koichi Nakamura, Miyoshi (JP); Tomoaki Furukawa, Toyota (JP); Kiyonori Takagi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/264,006

(22) Filed: Jan. 31, 2019

(65) Prior Publication Data
US 2019/0232778 A1 Aug. 1, 2019

(30) Foreign Application Priority Data

Feb. 1, 2018 (JP) .................. 2018-016801

(51) Int. Cl.
*B60K 11/00* (2006.01)
*B60K 11/08* (2006.01)
*B60K 13/04* (2006.01)
*B62D 35/02* (2006.01)
*B60K 11/06* (2006.01)
*B60K 11/02* (2006.01)
*B60K 13/02* (2006.01)
*B60K 11/04* (2006.01)

(52) U.S. Cl.
CPC .............. *B60K 11/08* (2013.01); *B60K 11/02* (2013.01); *B60K 11/04* (2013.01); *B60K 11/06* (2013.01); *B60K 13/02* (2013.01); *B60K 13/04* (2013.01); *B62D 35/02* (2013.01); *B60Y 2306/01* (2013.01)

(58) Field of Classification Search
CPC ......... B60K 11/08; B60K 11/04; B60K 11/06; B60K 11/02; B60K 1/04
See application file for complete search history.

(56) References Cited

U.S. PATENT DOCUMENTS

| 2,100,490 | A | * | 11/1937 | Rippingille | ............ | B60K 11/04 |
| | | | | | | 180/68.1 |
| 4,558,634 | A | * | 12/1985 | Oshiro | .................. | B60H 1/244 |
| | | | | | | 454/165 |
| 4,889,382 | A | * | 12/1989 | Burst | ..................... | B60K 11/08 |
| | | | | | | 296/180.5 |
| 6,129,056 | A | * | 10/2000 | Skeel | ....................... | F01P 3/18 |
| | | | | | | 123/41.49 |

(Continued)

FOREIGN PATENT DOCUMENTS

DE 102010011495 A1 9/2011
IE 102010007633 A1 8/2011
(Continued)

*Primary Examiner* — Hau V Phan
(74) *Attorney, Agent, or Firm* — Dinsmore & Sjohl LLP (57) ABSTRACT A cooling device of a vehicle includes a cooler body of a heat exchanging type and an air intake duct which are disposed in a rear portion of the vehicle. The air intake duct extends backwardly from the cooler body in a longitudinal direction of the vehicle, and is disposed such that the air intake duct is displaceable relative to the cooler body forwardly of the vehicle upon application of an impact load to the air intake duct. The cooler body is attached to a body of the vehicle, while the air intake duct is attached to the cooler body, such that a strength of attachment of the air intake duct to the cooler body is lower than a strength of attachment of the cooler body to the body of the vehicle.

7 Claims, 6 Drawing Sheets

(56) References Cited

U.S. PATENT DOCUMENTS

| | | | | |
|---|---|---|---|---|
| 8,556,014 B2* | 10/2013 | Smith | ............... | B60K 11/04 |
| | | | | 123/41.49 |
| 8,651,211 B2* | 2/2014 | Wolf | ............... | B62D 35/007 |
| | | | | 180/68.1 |
| 9,490,459 B2* | 11/2016 | Takizawa | ............ | H01M 10/613 |
| 9,623,741 B2* | 4/2017 | Honda | ............... | B60K 1/04 |
| 2001/0030069 A1* | 10/2001 | Misu | ............... | B60K 1/04 |
| | | | | 180/68.1 |
| 2004/0231898 A1* | 11/2004 | Hochkoenig | ......... | B60K 11/06 |
| | | | | 180/68.1 |
| 2009/0088064 A1 | 4/2009 | Lin | | |
| 2009/0260905 A1* | 10/2009 | Shinmura | ............ | H01M 10/647 |
| | | | | 180/68.1 |
| 2011/0001329 A1* | 1/2011 | Froeschle | ............. | B60J 1/2008 |
| | | | | 296/76 |
| 2011/0192659 A1 | 8/2011 | Chew et al. | | |
| 2011/0226542 A1 | 9/2011 | Steller | | |
| 2012/0318591 A1* | 12/2012 | Lim | ............... | B60K 1/04 |
| | | | | 180/65.31 |
| 2013/0168167 A1* | 7/2013 | Matsumoto | ............. | B60K 1/04 |
| | | | | 180/65.31 |
| 2015/0195960 A1* | 7/2015 | Seki | ............... | B60L 1/003 |
| | | | | 361/690 |
| 2017/0267094 A1* | 9/2017 | Pfeiffer | ............... | B60K 11/08 |
| 2017/0361882 A1* | 12/2017 | Weber | ............... | B62D 35/007 |
| 2018/0257482 A1 | 9/2018 | Kondo et al. | | |
| 2018/0319269 A1* | 11/2018 | Weber | ............... | B62D 37/02 |

FOREIGN PATENT DOCUMENTS

| | | |
|---|---|---|
| JP | 2006103365 A | 4/2006 |
| JP | 2017094771 A | 6/2017 |

* cited by examiner

VEHICULAR COOLING DEVICE

CROSS-REFERENCE TO RELATED APPLICATIONS

This application claims priority to Japanese Patent Application No. 2018-016801, filed on Feb. 1, 2018, the entire disclosure of which is herein incorporated by reference in its entirety.

TECHNICAL FIELD

The present disclosure relates to a cooling device of a vehicle, and more particularly, to an improvement of the cooling device of a vehicle wherein a body of the cooling device and an air intake duct are disposed in a rear portion of the vehicle.

BACKGROUND

There is known a cooling device of a vehicle, which comprises a cooler body of a heat exchanging type and an air intake duct which are disposed in a rear portion of the vehicle, and wherein a coolant such as an oil or a water flows through the cooler body, and an ambient air for cooling the coolant with heat exchanging between the coolant and the ambient air is introduced through the air intake duct into the cooler body. JP2017-94771A discloses an example of such a cooling device. This cooling device is provided on a vehicle wherein a transaxle for driving rear wheels of the vehicle is disposed backwardly of a central portion of the vehicle, and a body of the cooling device (cooler body) for cooling the coolant in the transaxle is disposed backwardly of a rear portion of the vehicle located backwardly of the transaxle. Further, JP2006-103365A describes a cooling technique of a differential pressure air introducing type to cool an electric power source device of a vehicle with ambient air. The vehicle has an air exhaust duct wherein a negative air pressure is generated due to an air stream generated during running of the vehicle. The air existing within the electric power source device (the ambient air used to cool the electric power source device) is exhausted into the outside atmosphere through the air exhaust duct, under the negative air pressure within the air exhaust duct, while fresh ambient air is introduced into the electric power source device through the air intake duct.

The air intake duct of the cooling device constructed, as described above, is attached to the cooler body such that the air intake duct extends backwardly from the cooler body in a longitudinal direction of the vehicle, to a position close to a rear end of the vehicle, an impact load applied to the air intake duct upon collision of the vehicle with another vehicle following the vehicle in question or an object located backwardly of the vehicle in question is transmitted from the air intake duct to the cooler body. In this event, there is a risk of damaging of the cooler body and consequent leakage of the coolant. The air intake duct extending backwardly from the cooler body is easily applicable to the cooling device of the differential pressure air introducing type. However, an ordinary type of cooling device wherein the air intake duct is open forwardly of the vehicle may be configured such that an intermediate portion of the air intake duct extends backwardly from the cooler body. The cooling device may also be configured such that the ambient air is introduced into the cooler body, with the aid of an electric fun, through the air intake duct extending backwardly from the cooler body. The cooling devices of these types also have the above-described risk of damaging of the cooler body and the leakage of the coolant.

SUMMARY

The present disclosure was made in view of the background art described above. It is therefore an object of the present disclosure to provide a cooling device of a vehicle in which an air intake duct is attached to a cooler body of the cooling device such that the air intake duct extends backwardly from the cooler body, and which is configured to reduce a risk of damaging of the cooler body due to an impact load transmitted from the air intake duct directly to the cooler body upon collision of the vehicle from rearward.

The object indicated above is achieved according to the following aspects of the present disclosure:

According to a first aspect of the present disclosure, there is provided a cooling device of a vehicle comprising a cooler body of a heat exchanging type and an air intake duct which are disposed in a rear portion of the vehicle, and wherein a coolant flows through the cooler body, and an ambient air for cooling the coolant with heat exchanging between the coolant and the ambient air is introduced through the air intake duct into the cooler body, the air intake duct extends backwardly from the cooler body in a longitudinal direction of the vehicle, and is disposed such that the air intake duct is displaceable relative to the cooler body forwardly of the vehicle upon application of an impact load to the air intake duct; and the cooler body is attached to a body of the vehicle, while the air intake duct is attached to the cooler body, such that a strength of attachment of the air intake duct to the cooler body is lower than a strength of attachment of the cooler body to the body of the vehicle.

In a second aspect of the present disclosure, the cooling device according to the first aspect of the present disclosure is configured such that the cooler body is attached to the body of the vehicle through at least one metallic member while the air intake duct is attached to the cooler body through at least one resin member.

In a third aspect of the present disclosure, the cooling device according to the first or second aspect of the present disclosure is configured such that the air intake duct has an air inlet portion through which the ambient air is introduced into the cooler body, and is attached to the cooler body such that the air inlet portion is held in fluid-tight contact with the cooler body.

In a fourth aspect of the present disclosure, the cooling device according to the third aspect of the present disclosure is configured such that the cooler body has a flat box outer configuration having upper and lower surfaces which are substantially parallel to a horizontal plane and each of which has a large area, and the ambient air is introduced into the cooler body through the upper surface, and is discharged from the cooler body through the lower surface. The air inlet portion of the air intake duct covers the upper surface of the cooler body.

In a fifth aspect of the present disclosure, the cooling device according to any one of the first through fourth aspects of the present disclosure further comprises an air exhaust duct having an air outlet through which the ambient air discharged from the cooler body is exhausted into outside atmosphere and at which a negative air pressure is generated due to an air stream generated during running of the vehicle. In this fifth aspect of the present disclosure, the ambient air is exhausted into the outside atmosphere through the air outlet of the air exhaust duct under the negative air pressure generated at the air outlet, while a fresh ambient air is introduced into the cooler body through the air intake duct. The cooling device is of a differential pressure air introducing type.

In a sixth aspect of the present disclosure, the cooling device according to the fifth aspect of the present disclosure is configured such that the air exhaust duct extends backwardly from the cooler body in the longitudinal direction of the vehicle, and is disposed such that the air exhaust duct is displaceable relative to the cooler body forwardly of the vehicle upon application of an impact load to the air exhaust duct. The air exhaust duct is attached to the cooler body, such that a strength of attachment of the air exhaust duct to the cooler body is lower than the strength of attachment of the cooler body to the body of the vehicle.

In a seventh aspect of the present disclosure, the cooling device according to the fifth or sixth aspect of the present disclosure is configured such that the cooler body has a flat box outer configuration having upper and lower surfaces substantially parallel to a horizontal direction and each having a large area, and is disposed below a floor panel of the vehicle, and the ambient air is introduced into the cooler body through the upper surface, and is discharged from the cooler body through the lower surface. The ambient air discharged from the cooler body through the lower surface is introduced into the air exhaust duct, and is downwardly exhausted into the outside atmosphere through the air outlet which is open downwardly.

It is noted that the upper and lower surfaces of the flat box outer configuration of the cooler body may be substantially parallel opposite two major surfaces of an elongate prism, or substantially parallel opposite end faces of a cylindrical or elliptical pillar having a small height dimension. In some embodiments, the thickness of the prism, or the height of the cylindrical or elliptical pillar is not larger than ½ or not larger than approximately ⅓ of a length of a diagonal line between the opposite two surfaces of the prism in longitudinal cross section, or a diameter of the cylindrical pillar or a dimension of the elliptical pillar along its major axis. The upper and lower surfaces of the flat box outer configuration need not be strictly parallel to each other, and strictly parallel to the horizontal plane, and may be inclined at an angle within a range of ±15° or approximately ±10°, with respect to the longitudinal (running) or transverse (width) direction of the vehicle, depending upon required conditions for installation of the cooler body on the vehicle.

In the cooling device according to the first aspect of the present disclosure, the air intake duct is disposed such that the air intake duct is displaceable relative to the cooler body forwardly of the vehicle upon application of an impact load to the air intake duct, and the cooler body is attached to the body of the vehicle, while the air intake duct is attached to the cooler body, such that the strength of attachment of the air intake duct to the cooler body is lower than the strength of attachment of the cooler body to the body of the vehicle. Accordingly, the air intake duct is disconnected or removed from the cooler body and moved forwardly when an impact load is applied to the air intake duct upon collision of the vehicle from rearward, so that the impact load applied to the cooler body is reduced. Thus, the present cooling device permits reduction of the risk of damaging of the cooler body and the consequent leakage of the coolant. The degree of damaging of the cooler body is reduced, and running of the vehicle can be continued, in the event of a comparatively light collision of the vehicle with the other vehicle or object located backwardly of the vehicle in question, without direct collision of the cooler body with the backwardly located vehicle or object.

It is noted that it is possible to prevent damaging of the cooler body upon application of the impact load to the air intake duct, by attaching the cooler body and the air intake duct to the vehicle body independently of each other such that the air intake duct is displaceable relative to the cooler body forwardly of the vehicle. In this case, however, there is a possibility that an amount of the ambient air to be introduced into the cooler body through the air intake duct is reduced due to mutual positional misalignment between the cooler body and the air intake duct, whereby the cooling performance of the cooling device may be deteriorated. To the contrary, the present cooling device wherein the air intake duct is attached to the cooler body has a low degree of possibility of the mutual positional misalignment between the cooler body and the air intake duct, so that the risk of deterioration of the cooling performance due to the mutual positional misalignment is reduced, and required degrees of dimensional and assembling accuracy of the cooling device can be made lower than where the cooler body and the air intake duct are attached to the vehicle body independently of each other.

In the cooling device according to the second aspect of the present disclosure, the cooler body is attached to the body of the vehicle through the at least one metallic member while the air intake duct is attached to the cooler body through the at least one resin member, the strength of attachment of the air intake duct to the cooler body can be stably made lower than the strength of attachment of the cooler body to the body of the vehicle. Accordingly, the air intake duct can be stably disconnected or removed from the cooler body forwardly of the vehicle upon collision of the vehicle from rearward.

In the cooling device according to the third aspect of the present disclosure, the air inlet portion of the air intake duct through which the ambient air is introduced into the cooler body is attached to the cooler body such that the air inlet portion is held in fluid-tight contact with the cooler body, the possibility of the mutual positional misalignment between the air intake duct and the cooler body is more adequately reduced than where the air intake duct and the cooler body are attached to the vehicle body, for example, independently of each other.

In the cooling device according to the fourth aspect of the present disclosure, the cooler body has the flat box outer configuration having the upper and lower surfaces which are substantially parallel to the horizontal plane and each of which has the large area, the ambient air is introduced into the cooler body through the upper surface, and is discharged from the cooler body through the lower surface, and the air inlet portion of the air intake duct covers the upper surface of the cooler body. Accordingly, the cooling device can be disposed compactly in a small space below the floor panel of the vehicle, for example. Further, the ambient air for cooling the coolant can efficiently flow into the cooler body through the comparatively large upper surface and from the cooler body through the comparatively large lower surface, so that the cooling device has a high degree of air cooling performance.

The cooling device according to the fifth aspect of the present disclosure further comprises the air exhaust duct having the air outlet at which the negative air pressure is generated due to the air stream generated during running of the vehicle. In this fifth aspect of the present disclosure, the ambient air is exhausted into the outside atmosphere through the air outlet of the air exhaust duct under the negative air pressure generated at the air outlet, while the fresh ambient air is introduced into the cooler body through the air intake duct. The cooling device is of a differential pressure air introducing type having a high degree of freedom of arrangement of the air intake duct. Described more specifically, the air intake duct can be easily disposed so as to extend to a position near the rear end of the vehicle, for example, so that the air intake duct is disconnected or removed from the cooler body when an impact load is applied to the air intake duct upon collision of the vehicle from rearward, whereby the risk of damaging of the cooler body can be effectively reduced.

In the cooling device according to the sixth aspect of the present disclosure, the air exhaust duct extends backwardly from the cooler body in the longitudinal direction of the vehicle, and is disposed such that the air exhaust duct is displaceable relative to the cooler body forwardly of the vehicle upon application of an impact load to the air exhaust duct, the air exhaust duct is attached to the cooler body, such that the strength of attachment of the air exhaust duct to the cooler body is lower than the strength of attachment of the cooler body to the body of the vehicle. Accordingly, the air exhaust duct is disconnected or removed from the cooler body, and displaced relative to the cooler body forwardly of the vehicle, when the impact load is applied to the air exhaust duct upon collision of the vehicle from rearward. As a result, the impact load applied to the cooler body is reduced, so that it is possible to reduce the risk of damaging of the cooler body and consequent leakage of the coolant. That is, the degree of damaging of the cooler body is reduced, and running of the vehicle can be continued, in the event of a comparatively light collision of the vehicle with the other vehicle or object located backwardly of the vehicle in question, without direct collision of the cooler body with the backwardly located vehicle or object. Further, the air exhaust duct is attached to the cooler body, so that a possibility of mutual positional misalignment between the cooler body and the air exhaust duct is more adequately reduced than where the air exhaust duct and the cooler body are attached to the vehicle body, for example, independently of each other.

In the cooling device according to the seventh aspect of the present disclosure, the cooler body has the flat box outer configuration having upper and lower surfaces substantially parallel to the horizontal direction and each having the large area, the cooler body is disposed below the floor panel of the vehicle, and the ambient air is introduced into the cooler body through the upper surface, and is discharged from the cooler body through the lower surface. The ambient air discharged from the cooler body through the lower surface is introduced into the air exhaust duct, and is downwardly exhausted into the outside atmosphere through the air outlet which is open downwardly. Accordingly, the cooling device can be compactly disposed below the floor panel of the vehicle. Further, the ambient air for cooling the coolant efficiently flows into the cooler body through the comparatively large upper surface, and from the cooler body through the comparatively large lower surface, so that the cooling device has a high degree of cooling performance.

DETAILED DESCRIPTION

The cooling device according to the present disclosure is applicable to various types of vehicle such as an engine-drive vehicle provided with a drive power source such as a gasoline engine, a diesel engine or any other type of internal combustion engine; an electric vehicle provided with at least one electric motor as a vehicle drive power source; a hybrid vehicle provided with an internal combustion engine and at least one electric motor as a vehicle drive power source; and a fuel-cell type electric vehicle having a fuel cell device as an electric power source for operating at least one electric motor. The cooling device is configured to cool a coolant (cooling medium) such as an oil or water used to cool heat generating components of a vehicle such as an internal combustion engine, at least one electric motor, a battery, an inverter, an electric power source device, an electronic controller, and a power transmitting mechanism including gear trains and a transmission belt.

The present disclosure is applicable suitably to a rear-wheel-drive vehicle of a type in which a drive power source to drive rear drive wheels is disposed in a rear portion of the vehicle, but is applicable also to a rear-wheel-drive vehicle of a type in which the drive power source to drive the rear drive wheels is disposed in a front portion of the vehicle. The present disclosure is further applicable to a front-and-rear-wheel-drive vehicle (a four-wheel or all-wheel drive vehicle), and a front-wheel-drive vehicle in which rear wheels are idler wheels.

In some embodiments, the cooler body and the air intake duct are disposed backwardly of the rear wheels of the vehicle. However, the cooler body and the air intake duct may be at any other longitudinal position of the vehicle, which is located backwardly of a longitudinally intermediate portion of the vehicle. For example, the cooler body is disposed backwardly of the longitudinally intermediate portion of the vehicle and forwardly of the rear wheels, while the air intake duct is disposed so as to extend to a point backwardly of the rear wheels. Since the air intake duct extends from the cooler body backwardly of the vehicle, an impact load is applied to the air intake duct before the impact load is applied to the cooler body, upon collision of the vehicle from rearward. In some embodiments, the air intake duct is spaced apart from the cooler body in the vertical or width (transverse) direction of the vehicle, so that the air intake duct is displaceable relative to the cooler body forwardly of the vehicle upon application of the impact load to the air intake duct. For instance, the air intake duct is disposed such that the air intake duct does not overlap the cooler body as seen in the horizontal plane (parallel to the horizontal direction and the longitudinal direction of the vehicle). However, the air induct duct may partially overlap the cooler body by a small distance in the horizontal plane, as long as the air intake duct is displaceable relative to the cooler body forwardly of the vehicle, without damaging of the cooler body. The air intake duct is generally attached to the cooler body such that the strength of attachment of the air intake duct to the cooler body is lower than the strength of attachment of the cooler body to the vehicle body. However, the air intake duct may be attached to a body member, rear bumper or any other part of the vehicle, which is other than the cooler body. Where the air intake duct is attached to the cooler body, the strength of this attachment is required to be lower than the strength of attachment of the cooler body to the vehicle body.

The cooler body is attached to the vehicle body with at least one metallic member, for example, while the air intake duct is attached to the cooler body with at least one resin member, for example. However, at least one member used to attach the cooler body to the vehicle body, and at least one member used to attach the air intake duct to the cooler body may be formed of the same material, or respective materials similar to each other. In this case, the strengths of attachments of the cooler body and the air intake duct are adjusted by suitably determining the numbers, sizes, positions and shapes of the members used to attach the cooler body and the air intake duct.

Where the air exhaust duct is disposed so as to extend from the cooler body backwardly of the vehicle, the air exhaust duct is fixed in a manner as described above with respect to the air intake duct. The air exhaust duct may be attached to only the vehicle body or the vehicle rear bumper, and may extend from the cooler body forwardly of the vehicle.

For example, the air intake duct is disposed such that the air exhaust duct partially overlaps the cooler body in the longitudinal direction of the vehicle, and has the air inlet for introducing the ambient air into the cooler body. This air inlet is formed in a portion of the air intake duct which overlaps the cooler body in the longitudinal or width direction of the vehicle. However, the air intake duct may have an air inlet formed to introduce the ambient air into the cooler body through a front surface of the cooler body. The air intake duct may be disposed such that the air intake duct is spaced apart from the cooler body in the vertical or width direction of the vehicle.

For instance, the cooler body has the flat box outer configuration having the large upper and lower surfaces substantially parallel to the horizontal direction, and is constructed such that the ambient air is introduced into the cooler body through the upper surface, and is exhausted from the cooler body through the lower surface. However, the flat box cooler body may be an elongate body disposed substantially upright or inclined with respect to the horizontal plane. For example, the flat box cooler body is a prism or cylindrical or elliptical pillar having a comparatively large length (height). The shape, attitude, positions of the air inlet and outlet and other specifications of the cooler body are suitably determined depending upon required conditions of installation of the cooler body on the vehicle.

The present disclosure is suitably applicable to the cooling device of the differential pressure air introducing type, the air exhaust duct of which has the air outlet at which the negative air pressure is generated due to the air stream generated during running of the vehicle. In this differential pressure air introducing type cooling device, the air inlet of the air intake duct is formed so as to be open backwardly, upwardly, downwardly, or sideways of the vehicle. However, the present disclosure is also applicable to a cooling device of an ordinary type in which the air inlet is open forwardly of the vehicle to naturally introduce the air stream in the backward direction during running of the vehicle, or with an electric fan to positively introduce the ambient air into the cooler body. In the differential pressure air introducing type cooling device, too, the air inlet of the air intake duct may be formed so as to be open forwardly of the vehicle. In the differential pressure air introducing type cooling device, the air outlet of the air exhaust duct is generally formed such that the ambient air discharged from the cooler body is exhausted downwardly through the air outlet. However, the air outlet may be formed so as to be open in a side surface of the vehicle which is spaced apart or distant from the cooler body.

Although the cooler body is a single body member disposed below the floor panel of the vehicle, for example, the cooler body may consist of a plurality of body members. Where the vehicle provided with the cooling device according to the present disclosure is an electric vehicle not provided with an engine, the air intake duct may be attached to an opening of a bumper designed for an engine-drive vehicle, which opening is held in communication of an exhaust pipe of the engine-drive vehicle. The cooler body need not be disposed below the floor panel of the vehicle, and may be disposed otherwise, for instance, above the floor panel, along a side surface of the vehicle extending in the longitudinal direction or along a cross member parallel to the width direction of the vehicle.

Embodiments of the present disclosure will be described in detail by reference to the drawings. It is to be understood that the drawings showing the embodiments are simplified or transformed as needed, and do not necessarily accurately represent dimensions and shapes of various elements of the embodiments.

Figure 1:
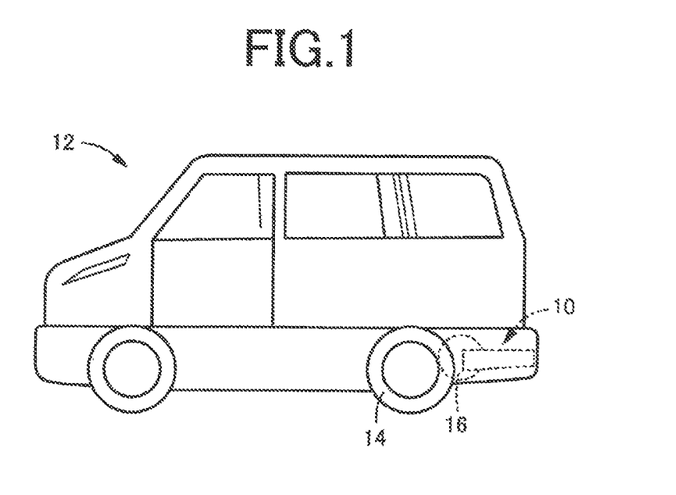
FIG. 1 is a schematic view showing a vehicle including a cooling device according to the present disclosure.

Reference is first made to FIG. 1, which is the schematic view of a vehicle 12 provided with a cooling device 10. The vehicle 12 is an electric vehicle of a fuel cell type having a fuel cell device, an electric motor M (shown in FIG. 2) and rear wheels 14. The fuel cell device generates an electric power with which the electric motor M is operated to generate a drive force for driving the rear wheels 14 for running of the vehicle 12. The fuel cell device includes a hydrogen tank 16 charged with a hydrogen used as a fuel. The hydrogen tank 16 and the cooling device 10 are disposed backwardly of the rear wheels 14 as viewed in a running or longitudinal direction of the vehicle 12. The cooling device 10 is configured to cool a coolant in the form of an oil, with heat exchanging between the oil and an ambient air. The cooled oil is supplied to the electric motor M, a transaxle, an electric power source device, etc. for cooling these components of the vehicle 12. The electric motor M as well as the hydrogen tank 16 and the cooling device 10 are disposed near the rear wheels 14 in the longitudinal direction of the vehicle 12. Thus, the vehicle 12 according to the present disclosure is a rear-wheel-drive vehicle of a type wherein a drive power source is disposed in a rear portion of the vehicle. The cooling device 10 consists of a pair of right and left units disposed on respective right and left sides of the vehicle 12. These two units are substantially symmetrical in construction with each other in the width direction of the vehicle 12. Hereinafter, the right unit of the cooling device 10 will be described in detail.

Figure 2:
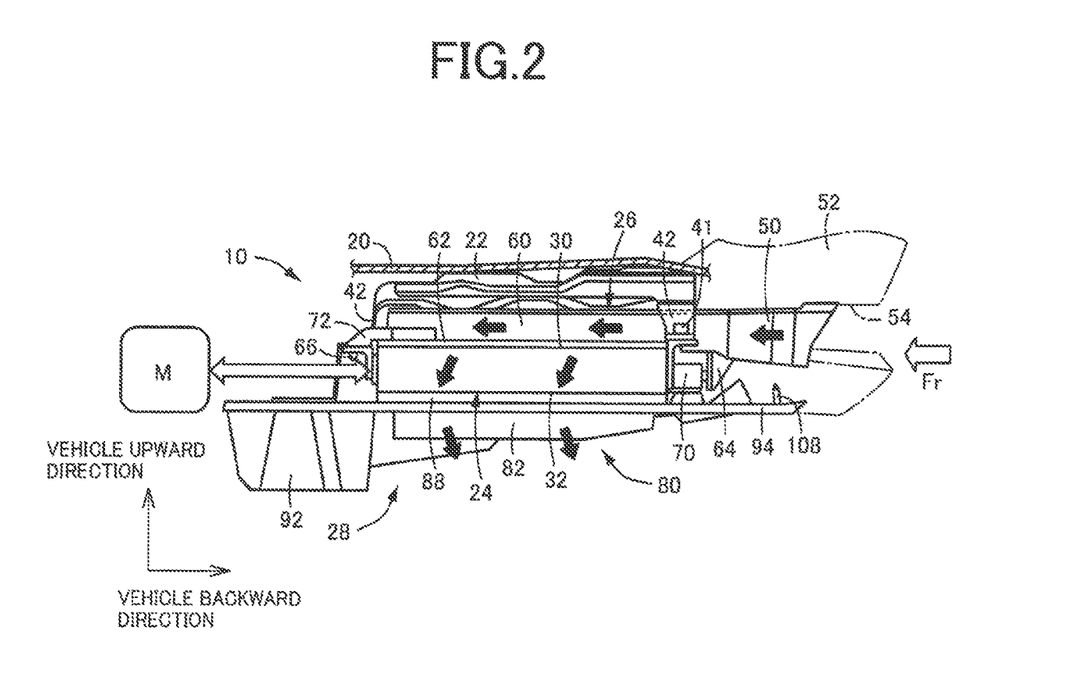
FIG. 2 is a left side elevational view of the cooling device of the vehicle of FIG. 1.
Figure 3:
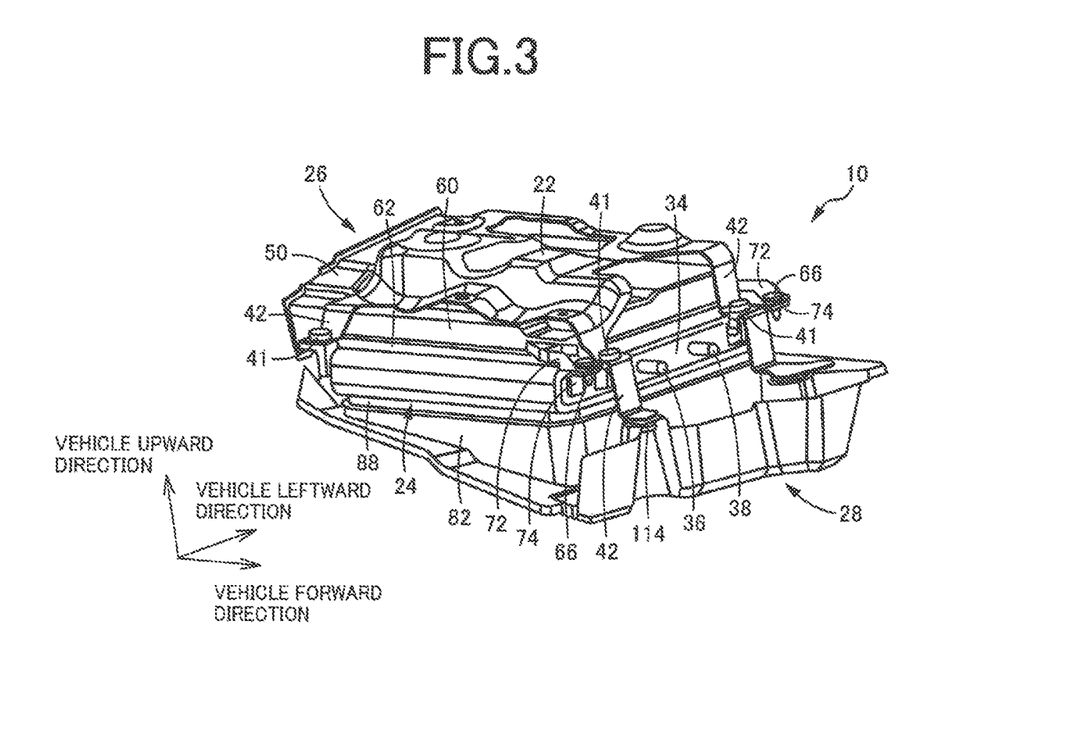
FIG. 3 is a perspective view of the cooling device of FIG. 2 as seen backwardly of the vehicle in an obliquely leftward and downward direction of the vehicle.
Figure 4:
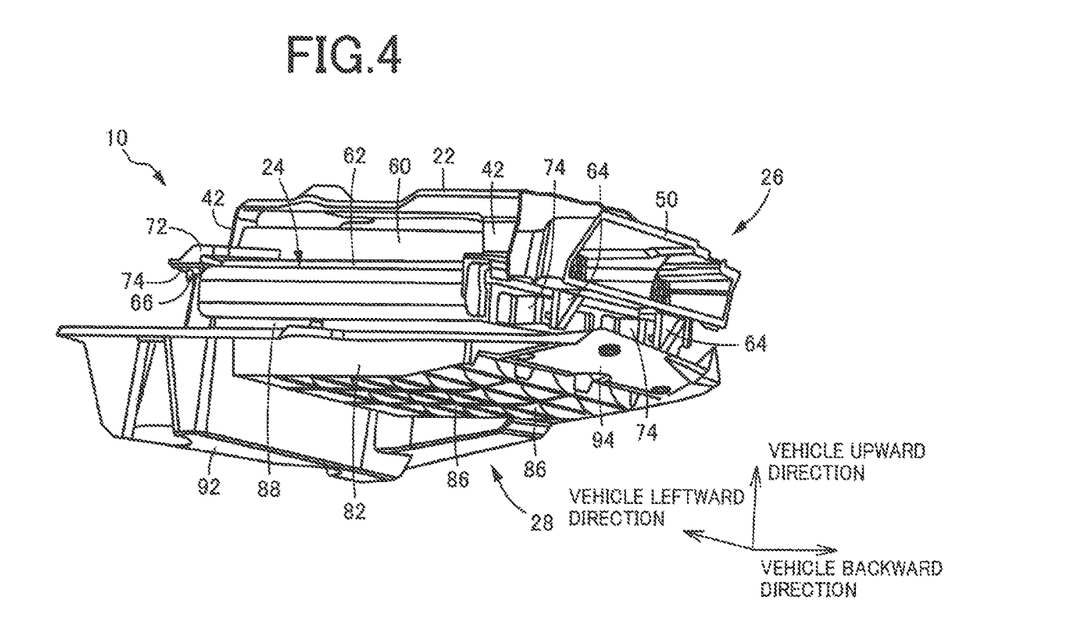
FIG. 4 is a perspective view of the cooling device of FIG. 2 as seen forwardly of the vehicle in an obliquely rightward and upward direction of the vehicle.
Figure 5:
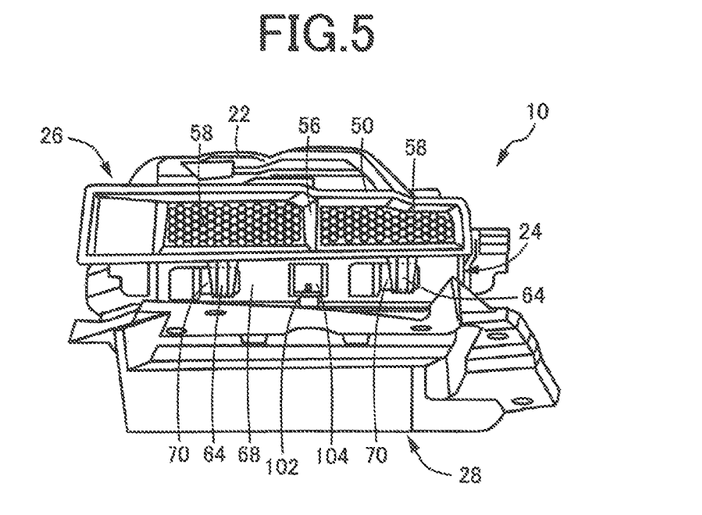
FIG. 5 is a rear end elevational view of the cooling device of FIG. 2 as seen forwardly of the vehicle in the horizontal direction.

FIG. 2 is the left side elevational view of the cooling device 10 of the vehicle 12 of FIG. 1. The cooling device 10 is disposed below a floor panel 20 of the vehicle 12, and is attached to a lower surface of the floor panel 20 through a metallic cooler attachment bracket 22. FIG. 3 is the perspective view of the cooling device 10 as seen backwardly of the vehicle 12 in an obliquely leftward and downward direction of the vehicle 12, and FIG. 4 is the perspective view of the cooling device 10 as seen forwardly of the vehicle 12 in an obliquely rightward and upward direction of the vehicle 12, while FIG. 5 is the rear end elevational view of the cooling device 10 as seen forwardly of the vehicle 12 in the horizontal direction. The cooling device 10 includes a cooler body 24, an air intake duct 26 for introducing the ambient air into the cooler body 24, and an undercover 28 disposed below the cooler body 24 to protect the cooler body 24 from muddy substances and other foreign matters splashed from the rear wheels 14. The floor panel 20 is a member of a vehicle body, and the air intake duct 26 functions as an ambient air intake duct for introducing the ambient air into the cooler body 24, while the undercover 28 functions as an air exhaust duct through which the air discharged downwardly from the cooler body 24 is exhausted downwardly into the outside atmosphere.

The cooler body 24 is formed of a metallic material such as an aluminum casting, and has a flat box outer configuration, more specifically, a thin rectangular parallelepiped. The cooler body 24 has substantially horizontally extending rectangular upper and lower surfaces 30 and 32 each having a large area. A rectangle of each of the upper and lower surfaces 30 and 32 has opposite sides (longer sides, for example) parallel to the running or longitudinal direction of the vehicle 12. The rectangular parallelepiped of the cooler body 24 is defined such that their rectangular upper and lower surfaces 30 and 32 are substantially parallel to each other, and such that a height of the cooler body 24 is, without limitation, not larger than ⅓ of a length of a diagonal line of the above-indicated rectangle. The cooler body 24 has at least one coolant flow passage (conduit) formed over an entire area of the rectangular parallelepiped, so that the oil serving as the coolant flows through the coolant flow passage. The ambient air introduced into the cooler body 24 through a substantially entire area of the rectangular upper surface 30 flows around the coolant flow passage, and is discharged downwardly through a substantially entire area of the rectangular lower surface 32, whereby the oil within the coolant flow passage is cooled with heat exchanging between the oil and the ambient air. The cooler body 24 has a pair of connecting ports 36 and 38 on a front surface, one of which is connected to an oil supply conduit through which the oil is supplied to the electric motor M and other devices to be cooled, and the other of which is connected to an oil return conduit through which the oil is returned from the devices to be cooled.

Figure 13:
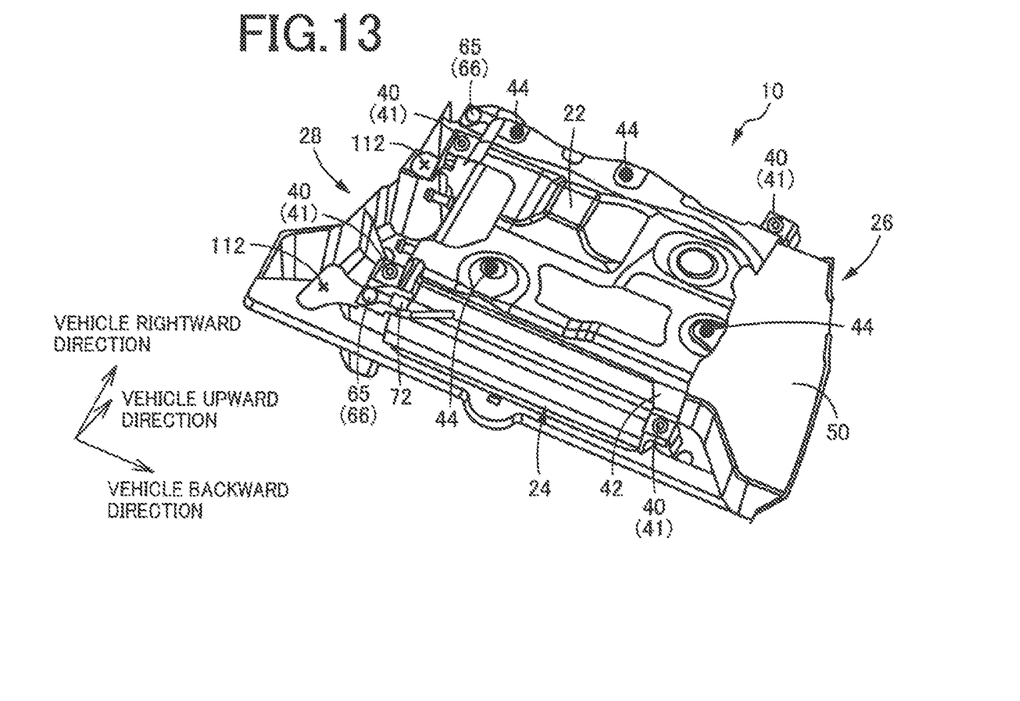
FIG. 13 is a perspective view of the cooling device of FIG. 2 as seen in an obliquely rightward and downward direction of the vehicle.

The cooler body 24 has four cooler fixing portions 40 shown in FIG. 13, and is fixed to the cooler attachment bracket 22 with metallic fixing bolts 41 (shown in FIG. 3 as well as in FIG. 13) provided at the cooler fixing portions 40. The cooler attachment bracket 22 is provided with two front arm portions 42 at two right and left front portions and two rear arm portions 42 at two right and left rear portions, as viewed in the running direction of the vehicle 12, such that the right and left front and rear arm portions 42 are disposed on respective right and left sides of the air intake duct 26, and such that the arm portions 42 extend downwardly of the air intake duct 26. The arm portions 42 are superposed on L-shaped metallic bracket members and fastened to the metallic bracket members with the fixing bolts 41 and nuts. The cooler attachment bracket 22 is fixed to the floor panel 20 with metallic fixing bolts (not shown) at four bracket fixing portions 44 shown in FIG. 13. FIG. 13 is the perspective view of the cooling device 10 as seen downwardly of the vehicle 12 in a rightward and downward direction of the vehicle 12. The cooler attachment bracket 22 and the fixing bolts 41 are metallic members with which the cooler body 24 is attached to a member of the vehicle body in the form of the floor panel 20.

The air intake duct 26 is a hollow structure formed of a synthetic resin material such as polypropylene (PP), and is disposed above the cooler body 24 such that a front portion of the air intake duct 26 as seen in the running direction of the vehicle 12 is superposed on the cooler body 24. A rear portion of the air intake duct 26 extends backwardly from the cooler body 24 in the running direction of the vehicle 12, and has an air inlet 50 through which the ambient air is introduced into the air intake duct 26. The rear portion of the air intake duct 26 is accommodated within an opening 54 formed in a rear bumper 52 of the vehicle 12, such that a rear end of the rear portion is located close to the rear end of the vehicle 12. The opening 54 may be an opening for an exhaust pipe provided on an engine drive vehicle, for instance.

Figure 6:
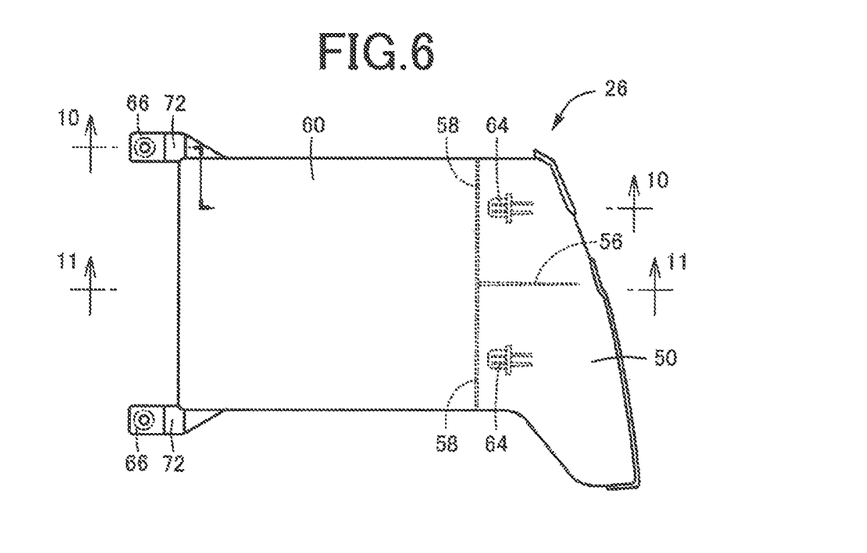
FIG. 6 is a plan view of an air intake duct of the cooling device of FIG. 2.
Figure 7:
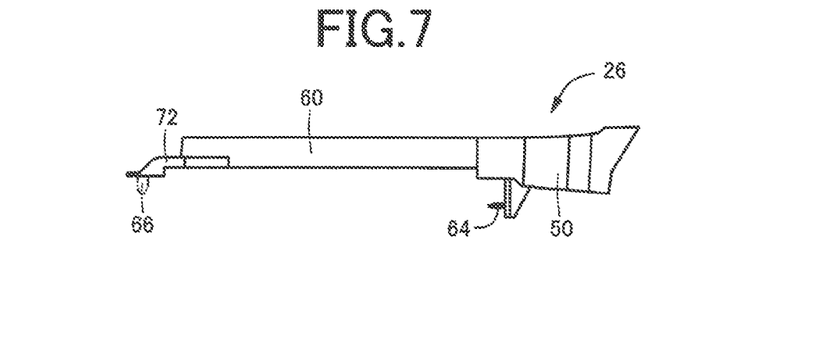
FIG. 7 is a left side (lower side as seen in FIG. 6) elevational view of the air intake duct of FIG. 6.
Figure 10:
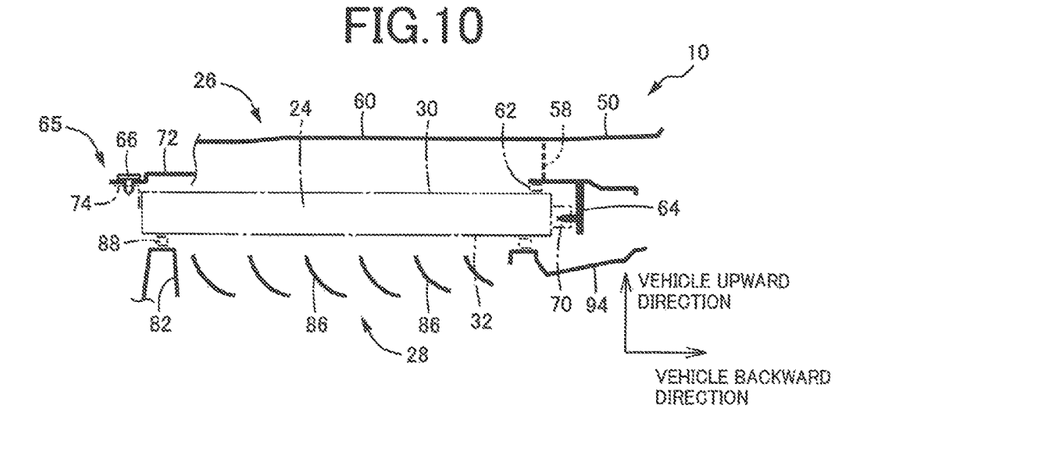
FIG. 10 is a cross sectional view of the cooling device of FIG. 6 taken in a direction along a line 10-10 of FIG. 6.
Figure 11:
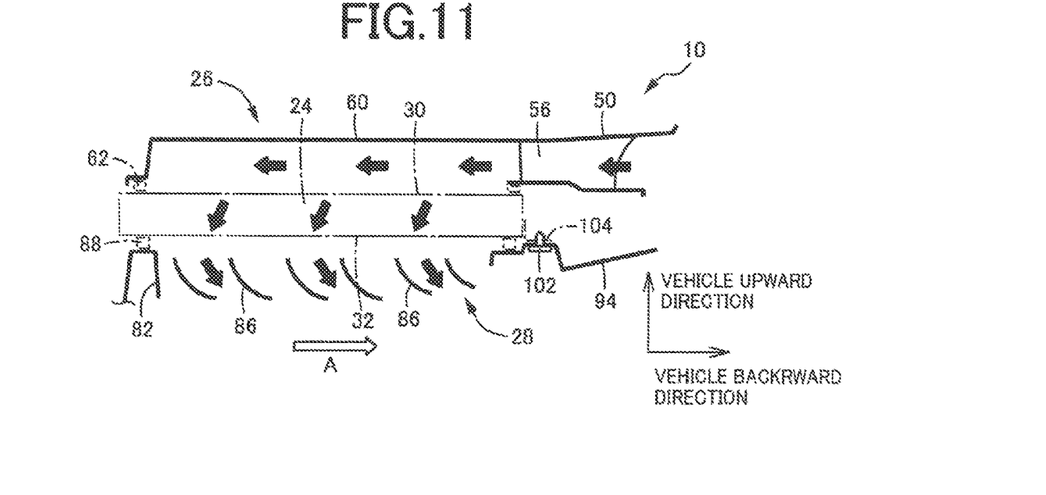
FIG. 11 is a cross sectional view of the cooling device of FIG. 6 taken in a direction along a line 11-11 of FIG. 6.

FIG. 6 is the plan view of the air intake duct 26, and FIG. 7 is the left side (lower side as seen in FIG. 6) elevational view of the air intake duct 26. FIG. 10 is the cross sectional view of the cooling device 10 taken in a direction along a line 10-10 of FIG. 6, and FIG. 11 is the cross sectional view of the cooling device 10 taken in a direction along a line 11-11 of FIG. 6. The air intake duct 26 is a generally flat box hollow rectangular parallelepiped, and is partially superposed on the cooler body 24 such that the air intake duct 26 is movable relative to the cooler body 24 in the forward direction of the vehicle 12, when a load is applied to the air intake duct 26. Described more specifically, the air intake duct 26 is positioned such that the air intake duct 26 does not overlap the cooler body 24 in the vertical direction in the rear end elevational view of FIG. 5 as seen forwardly of the vehicle 12, so that the air intake duct 26 is movable in the forward direction of the vehicle 12 on the cooler body 24. However, a rear portion of the air inlet 50 of the air intake duct 26 may overlap the cooler body 24, as long as the air intake duct 26 is movable forwardly of the vehicle 12 without damaging of the cooler body 24, owing to deformation of the air inlet 50. The air inlet 50 is divided into right and left parts by a partition plate 56, and has integrally formed mesh-type strainers 58 disposed therein, to prevent entry of foreign matters into the air inlet 50.

The front portion of the air intake duct 26 superposed on the upper surface 30 functions as an air inlet portion 60 open downwardly to introduce the ambient air into the cooler body 24. The air inlet portion 60 covers a substantially entire area of the upper surface 30 of the cooler body 24, so that the ambient air is introduced into the cooler body 24 from the air intake duct 26 through the substantially entire area of the upper surface 30, for instance, without limitation, not smaller than 80% of the entire area in which the at least one coolant flow passage is formed. Between the air inlet portion 60 and the upper surface 30 of the cooler body 24, there is interposed a sealing member 62 such as a packing in the form of a rectangular frame, so that the air inlet portion 60 is held in fluid-tight contact with the upper surface 30 through the sealing member 62. Thick arrow-headed lines in FIG. 11 represent flow paths of the ambient air along which the ambient air introduced into the air intake duct 26 through the air inlet 50 is introduced into the cooler body 24 through the air inlet portion 60, flows through the cooler body 24, and is discharged downwardly from the cooler body 24. Thick arrow-headed lines in the side elevational view of FIG. 2 represent flow paths of the ambient air substantially identical with those in FIG. 11.

Figure 14:
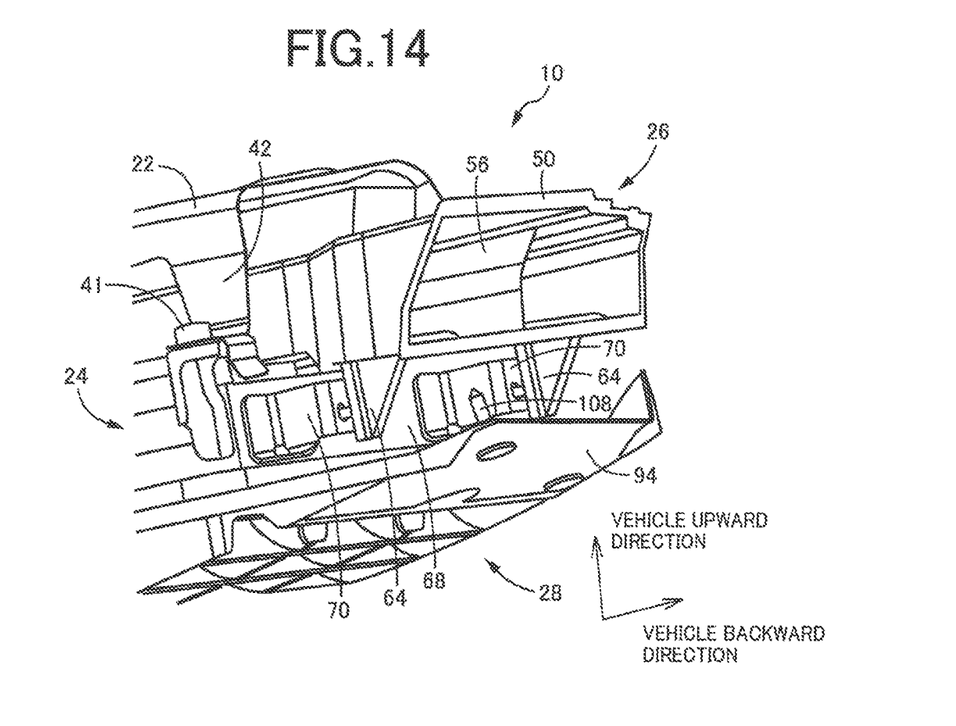
FIG. 14 is a perspective view of a rear portion of the cooling device of FIG. 2 as seen forwardly of the vehicle in an obliquely rightward and upward direction of the vehicle.

The air intake duct 26 constructed as described above is attached to the cooler body 24, with a pair of engaging jaws 64, shown in FIG. 4, and a pair of resin clips 66, shown in FIG. 13. The engaging jaws 64 are formed integrally with the lower surface of the air inlet 50 such that the two engaging jaws 64 are spaced apart from each other in the direction of width of the vehicle 12, while the resin clips 66 are fixed in respective clip fitting portions 65 also shown in FIG. 13. The cooler body 24 has a pair of attaching brackets 70 fixed to a rear surface 68 of the cooler body 24 as shown in FIG. 14. The attaching brackets 70 have respective engaging holes or slits for engagement with protrusions of the engaging jaws 64, such as jaw portions of the engaging jaws 64 which protrude in the forward direction of the vehicle 12, so that a portion of the air intake duct 26 in which the air inlet 50 is formed is prevented from being removed upwardly from the cooler body 24. FIG. 14 is the perspective view of the rear portion of the cooling device 10 as seen forwardly of the vehicle 12 in an obliquely rightward and upward direction of the vehicle 12. The two resin clips 66 are pre-fixed to respective right and left attaching arms 72 formed integrally with the rear portion of the cooling device 10 as seen in the running direction of the vehicle, and the attaching arms 72 are superposed on respective attaching brackets 74 fixed to the front surface 34 of the cooler body 24. In this state, the resin clips 66 are pressed into and through engaging holes formed in the attaching brackets 74, with temporary elastic reduction of diameters of the resin clips 66. Diameters of end portions of the resin clips 66 which have passed the engaging holes are elastically enlarged so that the resin clips 66 are fixed to the attaching brackets 74 such that the resin clips 66 are not removable from the engaging holes. Thus, the air intake duct 26 can be easily attached to the cooler body 24, with a single pressing action of each resin clips 66. Thickness, elasticity, material and other specifications of the sealing member 62 described above are suitably determined so as to ensure desired fluid tightness between the air inlet portion 60 and the upper surface 30 of the cooler body 24. It is noted that the resin clips 66 may be pressed into the engaging holes formed in the attaching arms 72 and the attaching brackets 74 which have been superposed on each other. The resin clips 66 function as resin members with which the air intake duct 26 is attached to the cooler body 24.

A strength of attachment of the air intake duct 26 to the cooler body 24 with the pair of engaging jaws 64 formed of a resin material and the pair of resin clips 66 is sufficiently lower than a strength of attachment of the cooler attachment bracket 22 to the cooler body 24 with the fixing bolts 41 formed of a metallic material. Described in detail, upon application of an impact load Fr (indicated in FIG. 2) to the air inlet 50 of the air intake duct 26 upon collision of the vehicle 12 with a vehicle following the vehicle 12, or with an object during backward running of the vehicle 12, some of the engaging jaws 64, the resin clips 66 and the attaching arms 72 are broken, so that the air intake duct 26 is disconnected or removed from the cooler body 24 and moved forwardly of the vehicle 12, before the cooler body 24 is damaged, whereby the impact load Fr acting on the cooler body 24 is reduced. Accordingly, the present cooling device 10 permits reduction of damaging of the cooler body 24 and prevention of leakage of the oil upon a comparatively light collision of the vehicle 12 with the vehicle following the vehicle 12 or the object located backwardly of the vehicle 12, without direct collision of the cooler body 24 with the other vehicle or the backward object.

Figure 8:
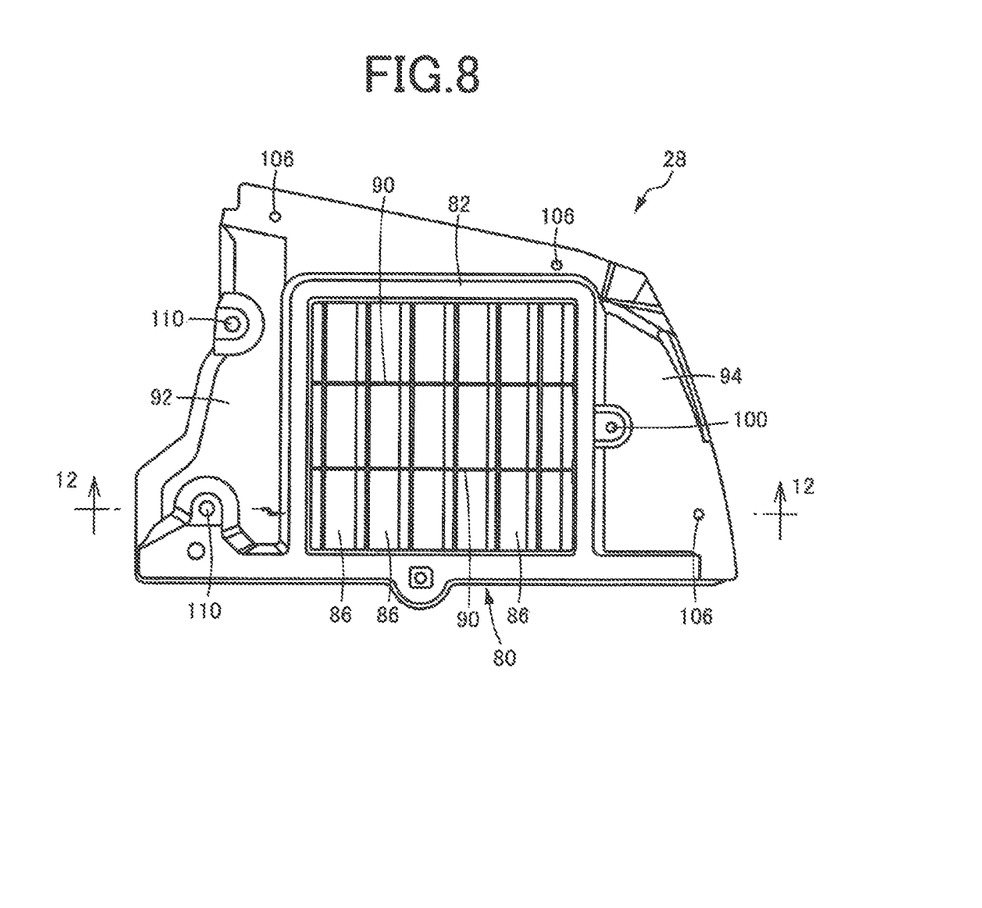
FIG. 8 is a plan view of an undercover of the cooling device of FIG. 2.
Figure 9:
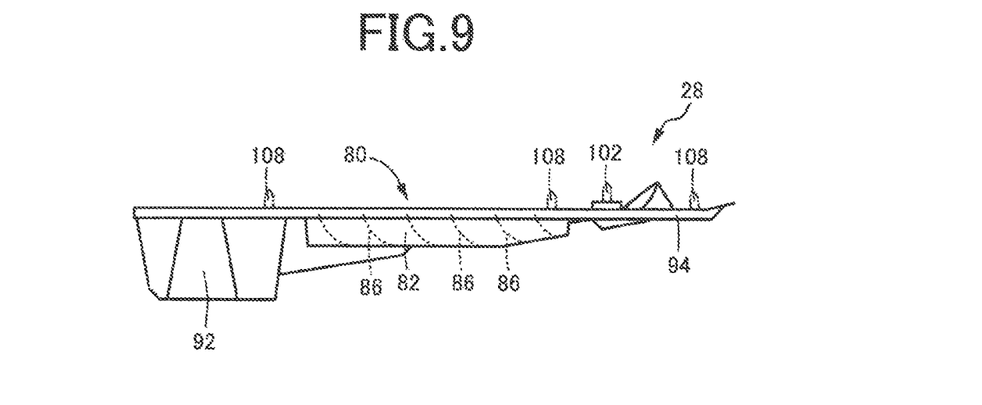
FIG. 9 is a left side (lower side as seen in FIG. 8) elevational view of the undercover of FIG. 8.
Figure 12:
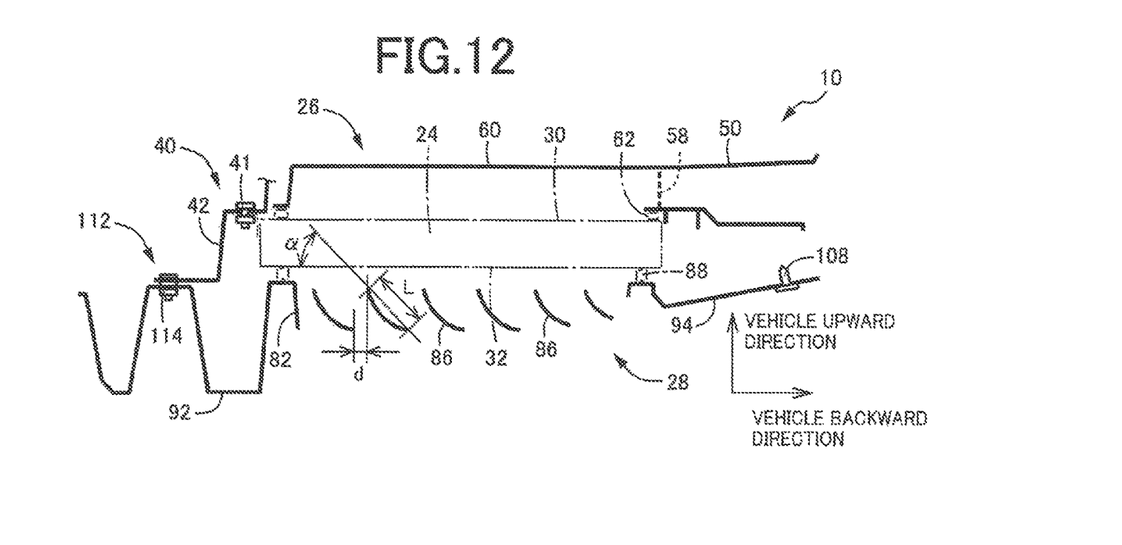
FIG. 12 is a cross sectional view of the cooling device of FIG. 6 taken in a direction along a line 12-12 of FIG. 8.

The undercover 28 functioning also as an air exhaust duct is formed of a synthetic resin material such as polypropylene (PP), and is disposed below the cooler body 24 such that an intermediate portion 80 of the undercover 28 as seen in the running direction of the vehicle 12 is superposed on the cooler body 24. FIG. 8 is the plan view of the undercover 28, and FIG. 9 is the left side (lower side as seen in FIG. 8) elevational view of the undercover 28, and FIG. 12 is the cross sectional view of the cooling device 10 taken in a direction along a line 12-12 of FIG. 8. The undercover 28 has a generally flat box configuration, and is disposed below the cooler body 24 such that the cooler body 24 and the undercover 28 are superposed on each other, and such that the undercover 28 is movable relative to the cooler body 24 upon application of a load to the undercover 28. The intermediate portion 80 disposed below the cooler body 24 is a portion also functioning as the air exhaust duct, and has an air outlet 82 formed therethrough in the vertical direction. The air discharged from the lower surface 32 of the cooler body 24 is exhausted downwardly through the air outlet 82 into the outside atmosphere. The air outlet 82 has a rectangular frame profile corresponding to the rectangular shape of the lower surface 32 of the cooler body 24. Within the air outlet 82, there are disposed a plurality of fins (in this embodiment, six fins) 86 extending substantially parallel to the width direction of the vehicle 12, for protecting the cooler body 24 from muddy substances splashed from the rear wheels 14.

Between the air outlet 82 and the lower surface 32 of the cooler body 24, there is interposed a sealing member 88 such as a packing in the form of a rectangular frame, as shown in FIG. 11, so that the air outlet 82 is fluid-tightly connected to the lower surface 32 through the sealing member 88. The air discharged through a substantially entire area of the lower surface 32, for instance, without limitation, not smaller than 80% of the area in which the coolant flow passage is formed flows into the air outlet 82. A negative air pressure is generated at a lower open end of the air outlet 82 in the form of a rectangular frame, due to an air stream A (indicated by a white arrow-headed line in FIG. 11) generated during running of the vehicle 12, so that the air discharged from the lower surface 32 of the cooler body 24 is exhausted downwardly through the air outlet 82, as indicated by thick black arrow-headed lines in FIG. 11, while the fresh air is introduced into the cooler body 24 through the air inlet 50 of the air intake duct 26. Thus, the cooling device 10 of the vehicle 12 according to the present disclosure is of the differential pressure air introducing type.

The plurality of fins 86 are configured to protect the cooler body 24 from muddy substances and pebble stones splashed by the rear wheels 14, while permitting the air discharged from the cooler body 24 to be exhausted downwardly. As shown in FIG. 12, the fins 86 are inclined at a predetermined same angle α with respect to the horizontal plane such that a lower end of the fin 86 is located backwardly of an upper end of the fin 86 in the longitudinal direction of the vehicle 12. Further, the fins 86 are spaced apart from each other in the longitudinal direction of the vehicle 12, by a predetermined distance d which is determined so as to minimize disturbance of the air flow through the air outlet 82, while preventing entry of the splashed pebble stones and other foreign matters such that two adjacent fins 86 in the vehicle longitudinal direction are not overlapped each other in the vehicle vertical direction. Furthermore, the fins 86 are curved so as to have a downwardly convex configuration, and have different length dimensions L between an upper and lower ends of each of the fins 86 determined such that the length dimensions L of the fins 86 comparatively distant from the rear wheels 14 are smaller than those of the fins 86 comparatively near the rear wheels 14, more specifically, such that the four front fins 86 have substantially the same length dimension L while two rear fins 86 have smaller length dimensions than the four front fins 86 and the rearmost one of the two rear fins 86 less likely to be subjected to exposure to the splashed pebble stones has the smaller length dimension L than the other of the two rear fins 86. The inclination angle α, distances d and length dimensions L of the fins 86 are suitably determined so as to minimize the disturbance of the air flow through the air outlet 82 while preventing the entry of the splashed pebble stones and other foreign matters, for example, such that all of straight lines from points in the entire area of the lower surface 32 of the cooler body 24, which are tangent with the outer circumference of the rear wheels 14, extend through any one of the fins 86. The fins 86 are connected to each other by two reinforcing ribs 90 each in the form of a vertical plate, which are located in an intermediate portion of the width of the vehicle 12, and disposed so as to extend in the longitudinal direction of the vehicle 12. It is noted that the fins 86 may be flat plates or sheets, and may be disposed such that the adjacent fins partially overlap each other in the longitudinal direction of the vehicle 12, such that the distance d may have a negative value.

The undercover 28 has a front portion 92 which extends forwardly from the front end of the cooler body 24 to protect the cooler body 24, and downwardly from the lower end of the air outlet 82 so that the negative air pressure is generated within the air outlet 82, due to the air stream A generated during running of the vehicle 12. The undercover 28 further has a rear portion 94 which extends backwardly from the rear end of the cooler body 24 back to a position near the rear end of the vehicle 12, like the air inlet 50, to reduce the air resistance within the undercover 28 during running of the vehicle 12. The rear portion 94 has a part which projects upwardly and partially overlaps the cooler body 24 as seen forwardly of the vehicle 12 in the horizontal direction, as seen in the rear end elevational view of FIG. 5. However, the above-indicated part of the rear portion 94 has only a small area of overlap with the cooler body 24, so that the undercover 28 can be moved forwardly relative to the cooler body 24 upon application of a load to the undercover 28, without damaging of the cooler body 24 due to deformation of the above-indicated part.

The undercover 28 constructed as described above has a receptacle hole 100 formed near a boundary between the intermediate portion 80 and the rear portion 94. A resin clip 102 is pre-fixed in the receptacle hole 100. On the other hand, the rear surface 68 of the cooler body 24 has an attaching bracket 104 fixed to a central part of the rear surface 68. The undercover 28 is tentatively assembled with respect to the cooler body 24, with a single action to press the resin clip 102 into a fixing hole formed in the attaching bracket 104. Then, the undercover 28 is positioned with respect to the cooler body 24. It is noted that the attaching bracket 104 is not shown in FIG. 14. The undercover 28 has three other receptacle holes 106 in which resin clips 108 are fixed, and the resin clips 108 are fixed to the rear bumper 52. Like the resin clips 66 described above, the resin clips 102 and 108 are fixed into the respective fixing holes with their elastic deformation such that the resin clips 102 and 108 are not removable from the fixing holes. Thus, the undercover 28 is fixedly attached to the cooler body 24 and the rear bumper 52. The front portion 92 of the undercover 28 has two fixing holes 110. On the other hand, the front arm portion 42 of the cooler attachment bracket 22 has two cover fixing portions 112, as shown in FIG. 12. These cover fixing portions 112 are also indicated by "x" marks in FIG. 13. Bolts fixed to the lower surfaces of the cover fixing portions 112 are inserted through the fixing holes 110, so that the front portion 92 is fixed to the cooler attachment bracket 22 by the bolts and resin nuts 114 (shown in FIGS. 3 and 12). As shown in FIGS. 3 and 12, the two arm portions 42 provided in the front portion of the cooler attachment bracket 22 extend downwardly to a level below the cooler body 24, and the front end portions of these arm portions 42 function as the cover fixing portions 112. The bolts fixed to the lower surfaces of the cover fixing portions 112 so as to extend downwardly are inserted through the fixing holes 110, and the resin nuts 114 are screwed on the bolts.

At the cover fixing portions 112, there is a predetermined amount of gap between each of the two arm portions 42 and the undercover 28, as is apparent from FIG. 12. A suitable cushioning member such as a rubber member is inserted in this gap, to permit the undercover 28 to be vertically moved relative to the arm portions 42, for reducing an amount of an upward impact load which is applied upwardly to the undercover 28 during running of the vehicle 12 over stones scattered on the roadway surface or on raised or recessed parts of the roadway surface, and which is transmitted to the arm portions 42. Further, there is a predetermined spacing distance, such as, without limitation, 15 mm to 25 mm, or in some embodiments, approximately 20 mm, between the undercover 28 and the lower surface 32 of the cooler body 24 when the undercover 28 is attached to the arm portions 42, the cooler body 24 and the rear bumper 52 with the cover fixing portions 112 and the above-described resin clips 102 and 108. The above-described sealing member 88 has a thickness (vertical dimension) of, without limitation, not smaller than 20 mm so that the sealing member 88 fluid-tightly closes a spacing between an upper open end of the air outlet 82 and the lower surface 32 of the cooler body 24, so that the air discharged from the cooler body 24 can be adequately exhausted downwardly through the air outlet 82 into the outside atmosphere, while the fresh ambient air is introduced into the cooler body 24 through the air intake duct 26, under the negative air pressure generated within the air outlet 82, whereby the cooling device 10 of the differential pressure air introducing type maintains a high degree of air cooling performance even in the presence of the above-indicated gap and spacing distance. In addition, elastic deformation of the sealing member 88 reduces an amount of impact load which is applied upwardly to the undercover 28 and which is transmitted to the cooler body 24, and accordingly reduces a degree of damaging of the cooler body 24 due to the impact load.

A strength of attachment of the undercover 28 to the cooler body 24 with the resin clip 102 is sufficiently lower than a strength of attachment of the cooler body 24 to the cooler attachment bracket 22 with the four fixing bolts 41. Described in detail, upon application of an impact load Fr to the rear portion 94 of the undercover 28 upon collision of the vehicle 12 on the rear side, the resin clip 102 is broken before the cooler body 24 is damaged due to the impact load Fr transmitted to the cooler body 24 through the resin clip 102, so that the undercover 28 is disconnected or removed from the cooler body 24, and is moved forwardly relative to the cooler body 24, whereby the impact load Fr acting on the cooler body 24 is reduced. Further, a strength of attachment of the undercover 28 to the rear bumper 52 and the cooler attachment bracket 22 with the three resin clips 108 and the two cover fixing portions 112 is sufficiently lower than a strength of attachment of the cooler body 24 to the cooler attachment bracket 22 with the four fixing bolts 41, so that the resin clips 108 and the resin nuts 114 are broken before the cooler body 24 is damaged due to the impact load Fr transmitted to the cooler body 24 through the arm portions 42, and the undercover 28 is removed from the rear bumper 52 and the cooler attachment bracket 22, whereby the impact load Fr acting on the cooler body 24 is reduced. Accordingly, the cooling device 10 permits reduction of damaging of the cooler body 24 and prevention of leakage of the oil upon comparatively light collision of the vehicle 12 with the vehicle following the vehicle 12 or the object located backwardly of the vehicle 12, without direct collision of the cooler body 24 with the other vehicle or the backwardly located object.

As described above, the cooling device 10 according to embodiments described herein is configured such that the air intake duct 26 is disposed above the cooler body 24 such that the air intake duct 26 is displaceable relative to the cooler body 24 forwardly of the vehicle 12 upon application of an impact load to the air intake duct 26, and the cooler body 24 is attached to the floor panel 20 through the cooler attachment bracket 22, while the air intake duct 26 is attached to the cooler body 24, such that the strength of attachment of the air intake duct 26 to the cooler body 24 is sufficiently lower than the strength of attachment of the cooler body 24 to the floor panel 20. Accordingly, the air intake duct 26 is disconnected or removed from the cooler body 24 and moved forwardly when the impact load Fr is applied to the air intake duct 26 upon collision of the vehicle 12 on the rear side, so that the impact load Fr applied to the cooler body 24 is reduced. Thus, the cooling device 10 permits reduction of the risk of damaging of the cooler body 24 and the consequent leakage of the coolant. The degree of damaging of the cooler body 24 is reduced, and running of the vehicle 12 can be continued, in the event of a comparatively light collision of the vehicle 12 with the other vehicle or object located backwardly of the present vehicle 12, without direct collision of the cooler body 24 with the backwardly located vehicle or object.

It is noted that it is possible to prevent damaging of the cooler body 24 upon application of the impact load Fr to the air intake duct 26, by attaching the cooler body 24 and the air intake duct 26 to the floor panel 20, for example, independently of each other. In this case, however, there is a possibility that an amount of the ambient air to be introduced into the cooler body 24 through the air intake duct 26 is reduced due to mutual positional misalignment between the cooler body 24 and the air intake duct 26, whereby the cooling performance of the cooling device 10 may be deteriorated. To the contrary, the cooling device 10 wherein the air intake duct 26 is attached to the cooler body 24 has a low degree of possibility of the mutual positional misalignment between the cooler body 24 and the air intake duct 26, so that the risk of deterioration of the cooling performance due to the mutual positional misalignment is reduced, and required degrees of dimensional and assembling accuracy of the cooling device 10 can be made lower than where the cooler body 24 and the air intake duct 26 are attached to the floor panel 20 independently of each other.

The cooling device 10 may be further configured such that the cooler body 24 is attached to the floor panel 20 through the metallic cooler attachment bracket 22 and the metallic fixing bolts 41 while the air intake duct 26 is attached to the cooler body 24 through the resin clips 66, so that the strength of attachment of the air intake duct 26 to the cooler body 24 can be stably made lower than the strength of attachment of the cooler body 24 to the floor panel 20. Accordingly, the air intake duct 26 can be stably disconnected or removed from the cooler body 24 forwardly of the vehicle 12 upon collision of the vehicle 12 on the rear side.

The cooling device 10 may also be configured such that the air intake duct 26 has the air inlet portion 60 through which the ambient air is introduced into the cooler body 24, and is attached to the cooler body 24 such that the air inlet portion 60 is held in fluid-tight contact with the upper surface 30 of the cooler body 24. Accordingly, the possibility of the mutual positional misalignment between the air intake duct 26 and the cooler body 24 is more adequately reduced than where the air intake duct 26 and the cooler body 24 are attached to the vehicle body, for example, independently of each other.

The cooling device 10 may be further configured such that the cooler body 24 has the flat box outer configuration having the upper and lower surfaces 30 and 32 which are located below the floor panel 20 of the vehicle 12 and are substantially parallel to the horizontal plane and each of which has the large area, so that the ambient air is introduced into the cooler body 24 through the upper surface 30, and is discharged from the cooler body 24 through the lower surface 32. Further, the air inlet portion 60 of the air intake duct 26 covers the upper surface 30 of the cooler body 24. Accordingly, the cooler body 24 can be disposed compactly in a small space below the floor panel 20, and the ambient air for cooling the coolant can efficiently flow into the cooler body 24 through the comparatively large upper surface 30 and from the cooler body 24 through the comparatively large lower surface 32, whereby the cooling device 10 has a high degree of air cooling performance.

The cooling device 10 may also be configured such that the undercover 28 has the air outlet 82 at which the negative air pressure is generated due to the air stream A generated during running of the vehicle 12. The ambient air discharged from the cooler body 24 is exhausted into the outside atmosphere through the air outlet 82 of the undercover 28 under the negative air pressure generated at the air outlet 82, while the fresh ambient air is introduced into the cooler body 24 through the air intake duct 26. Thus, the cooling device 10 is of the differential pressure air introducing type having a high degree of freedom of arrangement of the air intake duct 26. Described more specifically, the air intake duct 26 can be easily disposed so as to extend to a position near the rear end of the vehicle 12, so that the air intake duct 26 is disconnected or removed from the cooler body 24 when the impact load Fr is applied to the air intake duct 26 upon collision of the vehicle 12 on the rear side, whereby the risk of damaging of the cooler body 24 can be effectively reduced.

The cooling device 10 may be further configured such that the undercover 28 extends backwardly from the cooler body 24 in the longitudinal direction of the vehicle 12, and is disposed below the cooler body 24 such that the undercover 28 is displaceable relative to the cooler body 24 forwardly of the vehicle 12 upon application of an impact load to the undercover 28. The undercover 28 is attached to the cooler body 24 with the resin clip 102, so that the strength of attachment of the undercover 28 to the cooler body 24 is sufficiently lower than the strength of attachment of the cooler body 24 to the cooler attachment bracket 22. Accordingly, the undercover 28 is disconnected or removed from the cooler body 24, and displaced relative to the cooler body 24 forwardly of the vehicle 12, when the impact load Fr is applied to the undercover 28 upon collision of the vehicle 12 on the rear side. As a result, the impact load Fr applied to the cooler body 24 is reduced, so that it is possible to reduce the risk of damaging of the cooler body 24 and consequent leakage of the coolant. That is, the degree of damaging of the cooler body 24 is reduced, and running of the vehicle 12 can be continued, in the event of a comparatively light collision of the vehicle 12 with the other vehicle or object located backwardly of the vehicle 12, without direct collision of the cooler body 24 with the backwardly located vehicle or object. Further, the undercover 28 is attached to the cooler body 24, so that a possibility of mutual positional misalignment between the cooler body 24 and the undercover 28 is more adequately reduced than where the undercover 28 and the cooler body 24 are attached to the floor panel 20, for example, independently of each other.

The cooling device 10 may also be configured such that the cooler body 24 has the flat box outer configuration having the upper and lower surfaces 30 and 32 substantially parallel to the horizontal direction and each having the large area, and is disposed below the floor panel 20 of the vehicle 12, and the ambient air is introduced into the cooler body 24 through the upper surface 30, and is discharged from the cooler body 24 through the lower surface 32. The ambient air discharged from the cooler body 24 through the lower surface 32 is introduced into the undercover 28, and is downwardly exhausted into the outside atmosphere through the air outlet 82 which is open downwardly. Accordingly, the cooling device 10 can be compactly disposed below the floor panel 20 of the vehicle 12. Further, the ambient air for cooling the coolant efficiently flows into the cooler body 24 through the comparatively large upper surface 30, and from the cooler body 24 through the comparatively large lower surface 32, so that the cooling device 10 has a high degree of cooling performance.

While some embodiments of the present disclosure have been described above in detail by reference to the drawings, for illustrative purpose only, it is to be understood that the present disclosure may be otherwise embodied.

In some embodiments, the air intake duct 26 is attached to the cooler body 24 with the pair of engaging jaws 64 and the pair of resin clips 66. The number and positions of these engaging jaws 64 and resin clips 66 may be suitably changed. Further, the engaging jaws 64 may be replaced by additional resin clips, so that the air intake duct 26 is attached to the cooler body 24 with only the resin clips including the resin clips 66. Furthermore, various other fasteners such as resin screws may be employed for attaching the air intake duct 26 to the cooler body 24, as long as the fastener is broken before damaging of the cooler body 24. Further, a portion of the air intake duct 26 may be fixed to a member other than the cooler body 24, such as the rear bumper 52.

In some embodiments, the undercover 28 has the air outlet 82 located right below the cooler body 24 However, the undercover 28 may have an air outlet which is not located below the cooler body 24, for instance, which is open sideways of the vehicle 12.

It is to be understood that the present disclosure may be embodied with various other changes and improvements, which may be apparent to those skilled in the art.

What is claimed is:

1. A cooling device of a vehicle comprising a cooler body of a heat exchanging type and an air intake duct which are disposed in a rear portion of the vehicle, and wherein a coolant flows through the cooler body, and an ambient air for cooling the coolant with heat exchanging between the coolant and the ambient air is introduced through the air intake duct into the cooler body, the air intake duct extends backwardly from the cooler body in a longitudinal direction of the vehicle, and is disposed such that the air intake duct is displaceable relative to the cooler body forwardly of the vehicle upon application of an impact load to the air intake duct; and the cooler body is attached to a body of the vehicle, while the air intake duct is attached to the cooler body, such that a strength of attachment of the air intake duct to the cooler body is lower than a strength of attachment of the cooler body to the body of the vehicle.

2. The cooling device according to claim 1, wherein the cooler body is attached to the body of the vehicle through at least one metallic member while the air intake duct is attached to the cooler body through at least one resin member.

3. The cooling device according to claim 1, wherein the air intake duct comprises an air inlet portion through which the ambient air is introduced into the cooler body, and is attached to the cooler body such that the air inlet portion is held in fluid-tight contact with the cooler body.

4. The cooling device according to claim 3, wherein the cooler body has a flat box outer configuration having upper and lower surfaces which are substantially parallel to a horizontal direction and each of which has a large area, and the ambient air is introduced into the cooler body through the upper surface, and is discharged from the cooler body through the lower surface, and wherein the air inlet portion of the air intake duct covers the upper surface of the cooler body.

5. The cooling device according to claim 1, further comprising an air exhaust duct having an air outlet through which the ambient air discharged from the cooler body exhausted into outside atmosphere and at which a negative air pressure is generated due to an air stream generated during running of the vehicle, wherein the ambient air is exhausted into the outside atmosphere through the air outlet of the air exhaust duct under the negative air pressure generated at the air outlet, while a fresh ambient air is introduced into the cooler body through the air intake duct.

6. The cooling device according to claim 5, wherein the air exhaust duct extends backwardly from the cooler body in the longitudinal direction of the vehicle, and is disposed such that the air exhaust duct is displaceable relative to the cooler body forwardly of the vehicle upon application of an impact load to the air exhaust duct, and wherein the air exhaust duct is attached to the cooler body, such that a strength of attachment of the air exhaust duct to the cooler body is lower than the strength of attachment of the cooler body to the body of the vehicle.

7. The cooling device according to claim 5, wherein the cooler body has a flat box outer configuration having upper and lower surfaces substantially parallel to a horizontal direction and each having a large area, and is disposed below a floor panel of the vehicle, and the ambient air is introduced into the cooler body through the upper surface, and is discharged from the cooler body through the lower surface, and wherein the ambient air discharged from the cooler body through the lower surface is introduced into the air exhaust duct, and is downwardly exhausted into the outside atmosphere through the air outlet which is open downwardly.

* * * * *

UNITED STATES PATENT AND TRADEMARK OFFICE
CERTIFICATE OF CORRECTION

PATENT NO. : 10,828,979 B2
APPLICATION NO. : 16/264006
DATED : November 10, 2020
INVENTOR(S) : Koichi Nakamura, Tomoaki Furukawa and Kiyonori Takagi Page 1 of 1

It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (72), inventor 1, city, delete "Miyoshi" and insert --Miyoshi-shi Aichi--, therefor.

Item (72), inventor 2, city, delete "Toyota" and insert --Toyota-shi Aichi--, therefor.

Item (72), inventor 3, city, delete "Okazaki" and insert --Okazaki-shi Aichi--, therefor.

Item (73), assignee, city, delete "Toyota" and insert --Toyota-shi Aichi-ken--, therefor.

Column 2, item (56), foreign patent documents, cite no. 2, delete "IE102010007633 A1" and insert --DE102010007633 A1--, therefor.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*